(12) United States Patent
Landt

(10) Patent No.: US 6,766,312 B2
(45) Date of Patent: Jul. 20, 2004

(54) METHOD AND SYSTEM FOR A RANDOM NUMBER GENERATOR

(75) Inventor: Matthew Eugene Landt, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 662 days.

(21) Appl. No.: 09/773,195

(22) Filed: Jan. 31, 2001

(65) Prior Publication Data

US 2002/0143717 A1 Oct. 3, 2002

(51) Int. Cl.[7] .................................................. G06N 7/00
(52) U.S. Cl. ........................................ 706/59; 708/252
(58) Field of Search .......................... 706/59; 708/252; 713/2; 463/19

(56) References Cited

U.S. PATENT DOCUMENTS

| | | | | |
|---|---|---|---|---|
| 4,747,600 A | * | 5/1988 | Richardson | ................... 463/19 |
| 4,905,176 A | * | 2/1990 | Schulz | ........................ 708/252 |
| 5,054,787 A | * | 10/1991 | Richardson | ................... 463/19 |
| 6,185,678 B1 | * | 2/2001 | Arbaugh et al. | ................ 713/2 |

OTHER PUBLICATIONS

Hovemeyer, David, Atomic Instructions in Java, 2002, Proceedings of the 16th European Conference on Object–Oriented Programming, 2002, pp. 133–154.*

* cited by examiner

Primary Examiner—Wilbert L. Starks, Jr.
(74) Attorney, Agent, or Firm—Duke W. Yee; Mark E. McBurney

(57) ABSTRACT

A method, system and computer readable instructions for generating a random number consisting of a plurality of binary bits is provided. A race condition gate is set. An atomic lock is accessed wherein a first racer representing a first binary bit and a second racer representing a second binary bit race toward the atomic lock upon release of the race condition gate. A determination is made as to which of the first racer, representing the first binary bit, and the second racer, representing the second binary bit, gain access to the atomic lock earliest. The atomic lock is retrieved based on the determination of which racer gains access to the atomic lock earliest. A single binary value is then written to a data stream, the single binary value is based on which of the first racer and the second racer retrieves the atomic lock.

30 Claims, 3 Drawing Sheets

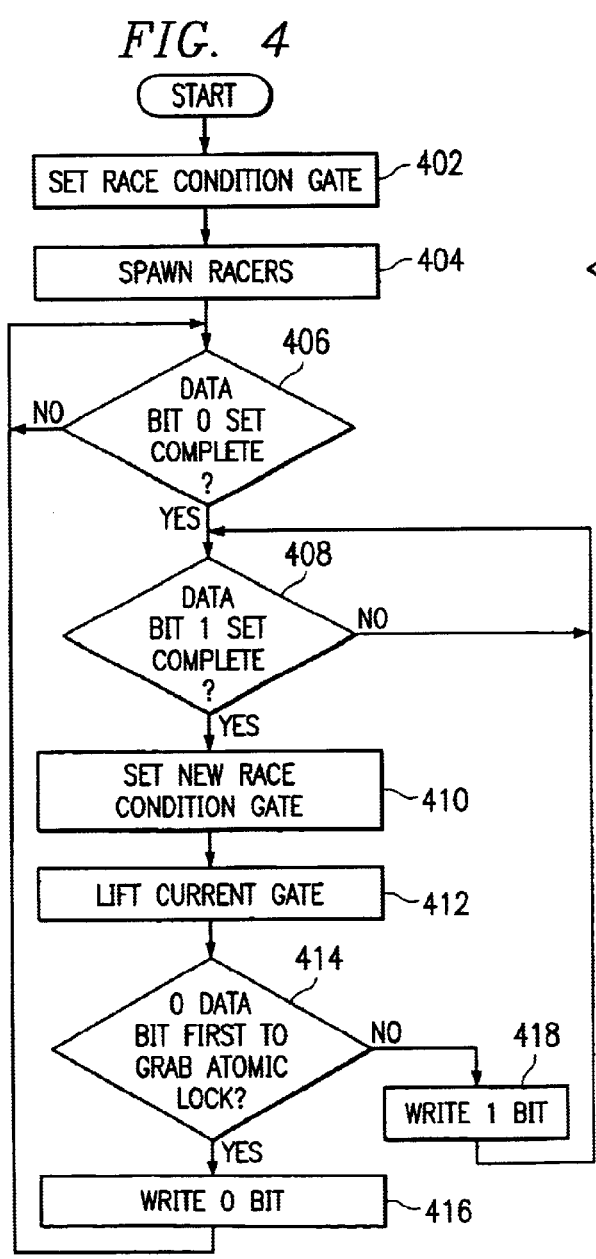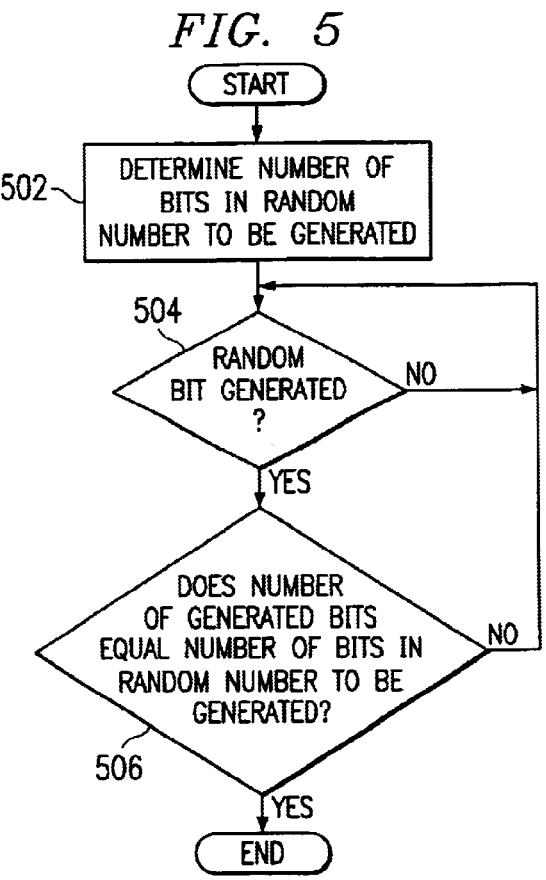

METHOD AND SYSTEM FOR A RANDOM NUMBER GENERATOR

BACKGROUND OF THE INVENTION

1. Technical Field

The present invention relates to an improved data processing system. More particularly, the present invention provides a method and system for a random number generator to provide security in a data processing system.

2. Description of Related Art

The worldwide network of computers commonly known as the "Internet" has seen explosive growth in the last several years. Mainly, this growth has been fueled by the introduction and widespread use of so-called "web browsers," which enable simple graphical user interface-based access to network servers, which support documents formatted as so-called "web pages." A browser is a program that is executed on a graphical user interface (GUI) in a client computer. The browser allows a user to seamlessly load documents from a server via the Internet and display them by means of the GUI. These documents are commonly formatted using markup language protocols, such as hypertext markup language (HTML).

The client and the web server typically communicate using hypertext transport protocol (HTTP). However, when a client is accessing sensitive information from a web server, a secure protocol may be used. Hypertext transport protocol secure is the protocol for accessing a secure Web server. Using HTTPS in the uniform resource locator (URL) instead of HTTP directs the message to a secure port number rather than the default Web port number of 80. The session is then managed by a security protocol. Secure sockets layer is the leading security protocol on the Internet. When a session is started in SSL, the browser sends its public key to the server so that the server can securely send a secret key to the browser. The browser and server exchange data via secret key encryption during that session.

However, HTTP is a stateless protocol. Therefore, every request from an HTTP client to an HTTP server is a new request and no state is maintained between requests. Conventionally, HTTP cookies are used to maintain a client-side state whereas sessions are used to manage the state information on the server side. A cookie is data created by a web server that is stored on a client computer. A cookie is used to keep track of a user's patterns and preferences and, with the cooperation of the Web browser, is stored within the client computer. Cookies contain a range of URLs for which they are valid. When the browser encounters those URLs again, it sends the appropriate cookies to the Web server.

A session is used to track the activities of a user. For example, a session may be created to allow a user to add items to a "shopping cart" using a plurality of individual requests. A session may also allow a user to use a web interface to search a database. Web interfaces may also be used to control equipment from remote locations. As web interfaces become increasingly popular, the security of sessions used to manage multiple transactions by individual clients becomes exceedingly important. Normally, a session is created on the server side. To associate a session with a user, a random number, referred to as a session identification (ID), is generated and associated with the user. The session ID is sent back to the browser as a cookie or through a URL rewriting mechanism.

When an HTTP request is received, the server verifies if a session ID is present. If an ID is present, the related session data is retrieved and the request is processed based on the session data. However, the server cannot verify that the user submitting the request is the same user to whom the session ID was originally assigned. Hence, a security loophole exists where an unauthorized user may submit a valid session ID. The session ID may be obtained by repeatedly submitting requests with potential session identifications until access is granted. Alternatively, the ID may be "sniffed" from the network by monitoring data traffic flow. The session ID may be obtained in this manner when a request is transmitted through an unsecure protocol, such as HTTP, as opposed to a secure protocol, such as HTTPS or SSL. In many web application server products, the security of session information is tied only to the randomness of the session ID under the assumption that the bit length of the number is high enough to prevent an unauthorized user from generating the same number in a short period of time. However, the likelihood of hijacking the session ID is not ruled out completely.

Random number generation is crucial to a data processing system which may include features such as, security, encryption, access control for software systems, authority certification, user authentication, security interfaces, copy protection, and the like. However, prior art random number generators contain inherent limitations. For example, prior art genuine random number generators may require external stimulation or use external stimulation, such as, for example, radioactive decay of rubidium, white noise generators, radio waves and the like. In addition, prior art random number generators that do not require external stimulation are pseudo-random. These pseudo-random number generators are mathematical based and may be predicted, repeating and are easy to break.

Therefore, it would be advantageous to have an improved method and apparatus for a genuine random number that overcomes the limitations of the prior art.

SUMMARY OF THE INVENTION

The present invention provides a method, system and computer readable instructions for generating a random number consisting of a plurality of binary bits. A race condition gate is set. An atomic lock is accessed wherein a first racer representing a first binary bit and a second racer representing a second binary bit race toward the atomic lock upon release of the race condition gate. A determination is made as to which of the first racer, representing the first binary bit, and the second racer, representing the second binary bit, gain access to the atomic lock earliest. The atomic lock is retrieved based on the determination of which racer gains access to the atomic lock earliest. A single binary value is then written to a data stream, the single binary value is based on which of the first racer and the second racer retrieves the atomic lock.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an exemplary random bit generator flowchart in accordance with a preferred embodiment of the present invention; and FIG. 5 is an exemplary random number generator flowchart in accordance with a preferred embodiment of the present invention.

DETAILED DESCRIPTION OF THE PREFERRED EMBODIMENT

Figure 1:
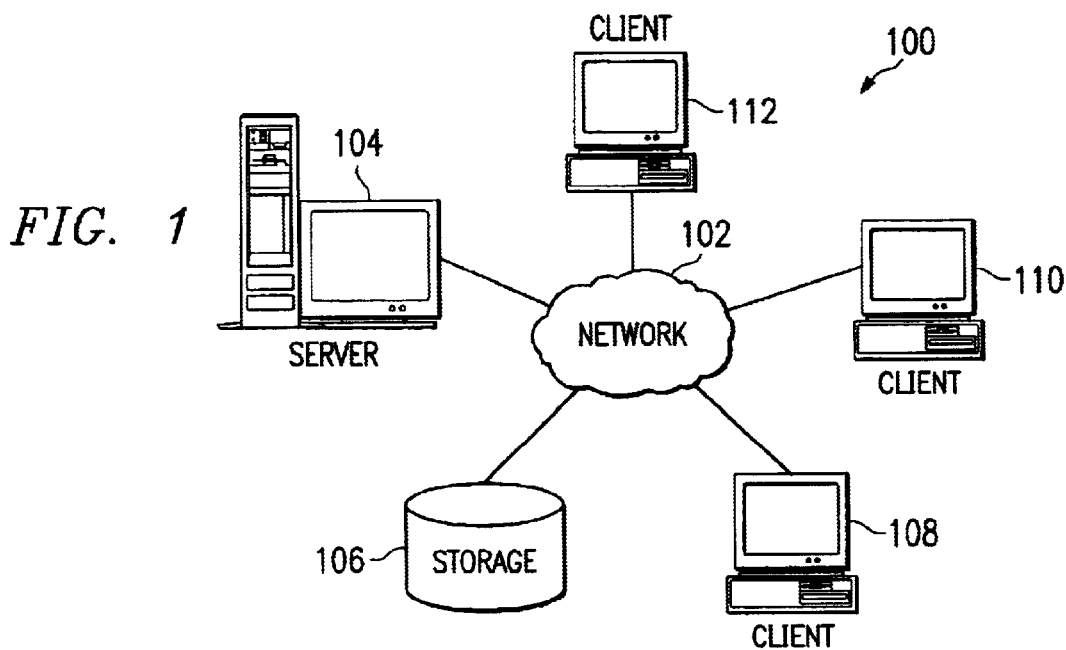
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
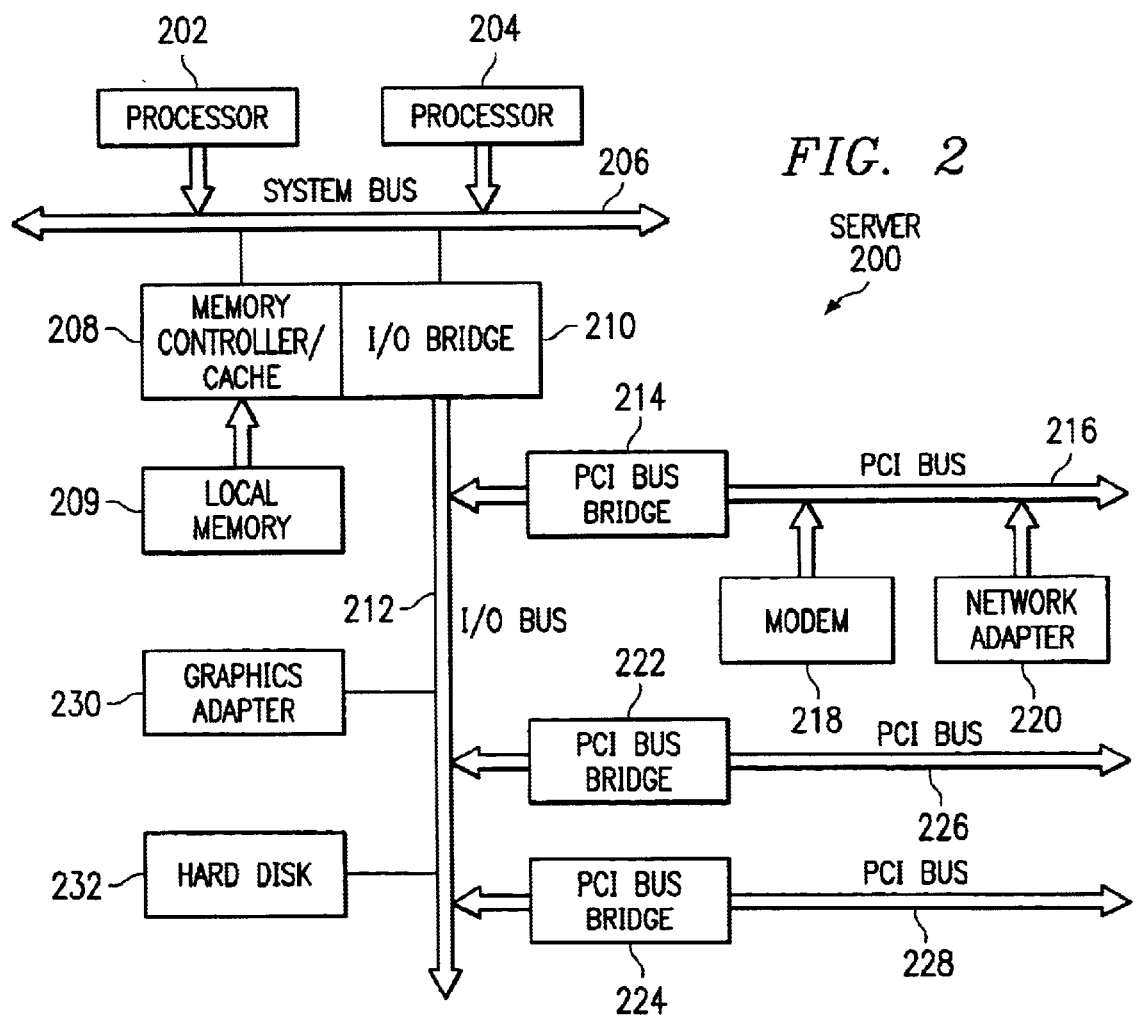
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
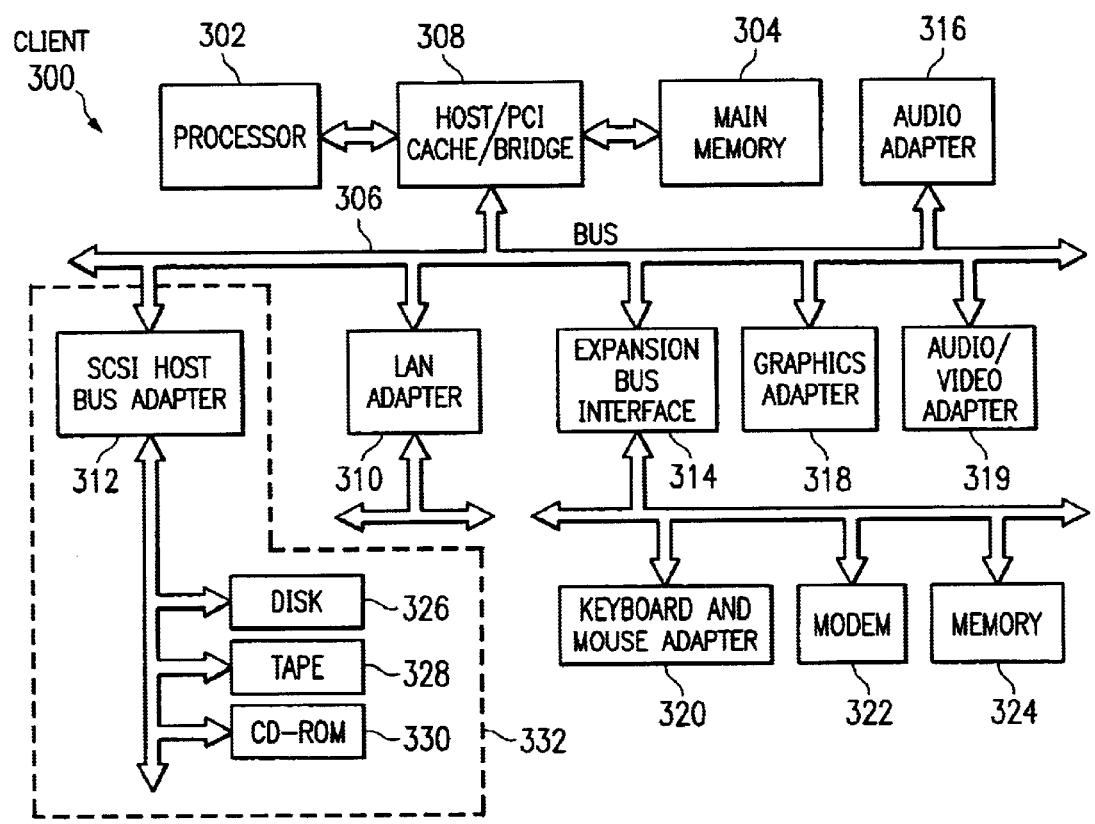
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a genuine random number generator which may be based on race conditions between at least two identically coded processes. No external stimulation or mathematical functions/algorithms are needed, so there is no possibility of breaking the random number generator. The randomness is based on a central processing unit allocation of time to a first process before a second process, thereby, the first process gains access to a first atomic lock.

An atomic lock comprises two concepts that may be combined to form a third concept. The first concept is a lock. A lock is an identifier that a computer program may use to state that the computer program is to be the only entity to use a resource. In pseudocode this may be a two step process. For example, the first step may be to check for the availability of the lock. If the lock is free, the second step is to seize the lock. The lock is recognized by the other entities involved in the process and may be, for example, the existence of a file, semaphores, values in a file, C code file locking, and the like. An example of a lock using pseudocode may be, for example:

step 1: IF THE FILE DOES NOT EXIST
   step 2: CREATE THE FILE (LOCK CREATED) ELSE
   step 3: SOMEONE ELSE HAS THE LOCK (FILE EXISTS)

The "lock" pseudocode above is not atomic. The second concept is "atomic" commands. An atomic command is a command that, once started, may complete the process without interruption. Most single instruction assembly level commands are atomic, such as, for example, shiftregister, add registers, storevaluie, and the like. However, within a computer, central processing unit (CPU) cycles may be taken away from any program at any time although a current atomic command is allowed to finish. As noted above, the lock may be a two step process. The first step checks for the lock, but it is the second step that creates the lock. The CPU could possibly be taken away between these two commands.

In a preferred embodiment of the present invention, there are 2 racers or two separate programs. Since the CPU may be taken away from either program at any point, both programs could possibly think they have obtained the lock. An example of the process may be:

FILE does not exist:
   Racer1: If FILE does not exist then lock is free CPU Taken from Racer1 and given to Racer2:
   Racer2: If FILE does not exist then lock is free
   Racer2: Create FILE (Create Lock) FILE now exists
   Racer2: Believes it has obtained the lock CPU Taken from Racer2
   and given to Racer1:
   Racer1: Previously tested for FILE and believes FILE does not exist
   Racer1: Create FILE (CREATE LOCK)
   Racer1: Believes it also has obtained the lock.

An atomic lock is a combination of the two concepts. The atomic lock tests for and retrieves the lock, if the lock is free, all within a single atomic operation. It keeps multiple programs from believing they have obtained the same lock.

One command that may be used for atomic locks in shell scripting is "mkdir". This command uses a directory for the lock instead of a file. However, an advantage of the mkdir command may be, for example, if the directory exists the command fails. If so, the above pseudocode may be reduced to:

```
    IF MKDIR SUCCEEDS
        LOCK RETRIEVED
    ELSE
        LOCK NOT RETRIEVED
```

This is not the only atomic locking mechanism but one simple example to help explain the atomic locking concept. During such a process there is a consistent load. The load in this invention relates to command queuing and the ability to predict which command will run. However, if the only program running on the computer is this locking mechanism, the process will never be random. For example, 3 processes may exist on the run queue in the order of CONTROL, RACER1, RACER2. These three processes are requeued in round robin order. The process just executed goes to the end of the queue. CONTROL has the CPU and releases a gate. Once the CPU is taken from CONTROL it is given to RACER1. RACER1 gets a lock and writes its value. The CPU then goes to RACER2, which does not receive the lock. Then the process returns back to CONTROL for another cycle.

An example of racer code may be, for example:

```
function racer {
    val=$1                      # $1 is the value passed 0 or 1.
    while true                  # run continuously
    do
        while true              # Wait for gate to be released
        do
            if [[ -e $RELFILE1 ]]
            then                # GATE RELEASED
                RELFILE3=$RELFILE2
                RELFILE2=$RELFILE1   # switch gates
```

```
                -continued

RELFILE1=$RELFILE3
          break              # break out of wait for gate, RACE
        fi
    done
    if mkdir $LOCKDIR
      then                   # lock was granted to this racer
        printf "$val"         # print this racer's passed value
      else                   # lock was taken already
    mkdir $LOCKDIR.2         # second lock shows last racer
                             # completed
    fi                       # second lock shows BOTH racers
                             # completed
    done}
        An example of control code may be, for example:
function control {
    while true               # Run continuously
    do
      if [[ -e $LOCKDIR && -e $LOCKDIR.2 ]]
        then                 # check for BOTH racers lock files
          rmdir $LOCKDIR     # remove one racer's lock file
          rmdir $LOCKDIR.2   # remove other racer's lock file
          rm $RELFILE2       # CLOSE secondary gate. If
                             # RELFILE exists, gate is OPEN.
          touch $RELFILE1    # release gate
          RELFILE3=$RELFILE2
          RELFILE2=$RELFILE1 # switch gates
          RELFILE1=$RELFILE3
      fi
    done }
```

With some computer systems there are hundreds or thousands of program entities running within a single second. Although the algorithm for queuing up the programs may be known, there are too many programs running to be able to keep track of which program will be next in the queue. Therefore, the 3 programs in this example, CONTROL, RACER1 and RACER2, may start entering the queue in a relatively random way as long as there are other operations currently running on the system. With different requeuing methods, the load needed to cause the numbers to emerge as random may vary. A system which has many continuous programs, which will contend for CPU cycles, may force requeuing of commands and therefore produce random numbers. With the load and the intricate methods of requeuing, it would be nearly impossible to predict the random number. In fact, the attempt to determine the random number may create load and potentially change the output. With a constant load and race programs and control program constantly operating, determining which process among a plurality of processes which race will gain access to the atomic lock, will be highly unlikely. Therefore, a random number may emerge after enough races have been completed, for example, eight races for an eight bit number, 32 races for a 32 bit number, etc.

As illustrated above, three separate processes may be involved. The first process may be a control process which maintains race condition gates that ensure that the race processes are ready to race. A gate mechanism may be used to avoid an affinity towards one racer. This gate mechanism is where the control program creates and removes a resource known by the control program and the racers. When the racers detect the presence or lack of this resource, they determine that the gate is released and proceed to race.

As an illustration, this process may be compared to a horse race. All horses are waiting to race but cannot proceed to go until an external resource (the starting gate) is released. It is up to each horse to determine if the starting gate is released and when to start the race. An impractical method for starting the race would be to tell each racer when to run. However, a control program may be showing favoritism towards one racer. In the horse race example, a person may walk down the line and tell each horse when to race. However, by the time the last horse is told, the first horse may have already won.

In a preferred embodiment, the gate mechanism has the control program work on a common resource and not on the racer programs. It is then up to the racer programs to determine if the gate is released and start racing.

The other two processes are the race processes themselves. One race process may designate a "1" and the other race process may designate a "0". When the control process releases a gate, the race gates will race to gain access to an atomic lock. Only one race process will succeed in gaining access to the atomic lock. The race process that succeeds may write its value out to a data stream. Where to write this value may be determined by a programmer. This value may be written, for example, to a file, CPU register, disk, network, and the like.

Each racer when it obtains the atomic lock will then write its value to the designated output location. Because of the nature of the atomic lock there should never be an instance where both racers write a value. In fact, the control program may use the fact that both racers should not write a value to verify the random number. If both racers output a value in one cycle, the control program may determine the number is corrupt and invalid. Once both race processes have completed their respective races, the control process releases the gate in anticipation of another race.

FIG. 4 is an exemplary random number generator flowchart in accordance with a preferred embodiment of the present invention. To make the race processes generate genuinely random number the following conditions may be met. First, the control gate to start a race may be a cyclic two fold gate. The cyclic two fold gate is using 2 gates where each program looks for one gate on a first cycle. Then on the second cycle they look for the second gate. The third cycle they look for the first gate again. A cyclic two fold gate is needed since the use of a single gate is inadequate. This is due to the concept that the CPU can be taken away from a program at any point and it may be some time before the control gets additional CPU time. The gate has to be down long enough to allow both racers to get out, and yet must be up quick enough to block both racers once they have gotten out.

For example, it takes the racers 5 seconds to race, write value, and get back to the gate. However, the CPU gives 15 seconds of processing time to each program. The control program releases the gate. Immediately after, the first racer now has 15 seconds to run. It will race, get a lock, write a value, and get back to the gate. However, the gate has not been reinstated. Since the racer detects that the gate is released, it will race, get a lock, write a value, and go back to the gate. This will happen 3 times in this example. In such a case, the value will not be truly random.

In a preferred embodiment of the present invention, the control program may create gate2 and release gate1. Racer1 will see gate1 released, race, get a lock, write a value, and look for gate2 (cyclic gate). Since gate2 was created before gate1 was released, racer1 will wait and do nothing for the remaining 10 seconds. Then only when racer2 gets out, races, does not get the lock (because racer1 has the lock), does not write value and waits for gate2, does the control program create gate1 and release gate2 (the current gate). This technique avoids "runaway" racers. In addition, if an element in the racer or control code gets confused, the random number generator will avoid outputting a non-random number due to runaway numbers, dead racers, dead controller, etc. In such a case, the random number generator may not output anything and this lack of output may be easily detected as an error.

Therefore, the control program does not create/release gates until both racers are waiting at the gates. Also the racers do not race until the current gate is released. All 3 programs should work correctly to allow processes to continue to write values. If an element within any of the 3 programs fail, a gate will not be released or a racer will not be waiting at a gate. In either scenario, no racer will get through to write its value.

Second, the race process code may be identical for each race process code except for their respective data bits (e.g., 0 or 1). Since the race process code is identical for each race process, this will help ensure true random numbers. Alternatively, if the process code is weighted higher for a first process than a second process, the random numbers may also be weighted toward the first process and therefore not truly random.

In this example, the operation begins by a setting a race condition gate (step 402). Then the racing processes are spawned (step 404). The racing processes are spawned or generated and put on the CPU's run queue to continue to run without further involvement of or without further interaction with the control program or other race programs. Then a determination is made as to whether or not a data bit "0" is set is complete. If the data bit "0" set is not complete (step 406: NO), the operation returns to step 406 in which a determination is made as to whether or not the data bit "0" set is complete. If the data bit "0" set is complete (step 406:YES), a determination is then made as to whether or not a data bit "1" set is complete (step 408). If the data bit "1" set is not complete (step 408:NO), the operation returns to step 408 in which a determination is made as to whether or not the data bit "1" set is complete. If the data bit "1" set is complete (step 408:YES), then a new race condition gate is set (step 410). The current race condition gate is then released (step 412).

Then a determination is made as to whether or not the "0" data bit is the first bit to grab an atomic lock (step 414). If the "0" data bit is the first data bit to grab the atomic lock (step 414:YES), the "0" data bit is written (step 416) and thereafter the operation returns to step 406 in which a determination is made as to whether or not the data bit "0" is the first set complete. If the "0" data bit is not the first bit to grab the atomic lock (step 414:NO), then the "1" bit is written (step 418) and the operation returns to step 408 in which a determination is made as to whether or not the data bit "1" set is complete.

FIG. 5 is an exemplary random number generator flowchart in accordance with a preferred embodiment of the present invention. In this example, the number of bits is determined in the random number to be generated (step 502). Then a determination is made as to whether or not a random bit is generated (step 504). If a random bit is not generated (step 504:NO), then the operation returns to step 504 in which a determination is made as to whether or not a random bit is generated. If a random bit is generated (step 504:YES), then a determination is made as to whether or not the number of bits generated equals the number of bits in the random number to be generated (step 506). If the number of generated bits does not equal the number of bits in the random number to be generated (step 506:NO), then the operation returns to step 504 in which a determination is made as to whether or not a random bit is generated. If the number of generated bits does equal the number of bits in the random number to be generated (step 506:YES) the process terminates.

The present invention provides an improved method and apparatus for a genuine random number generator that overcomes limitations of the prior art. The present invention has a control process which controls the racing of at least two racing processes. One racing process contains a "0" bit and another racing process contains a "1" bit. The control process controls the release of race condition gates. Once the race condition gates are released, the racing process first to take control of an atomic lock is the racing process which writes its bit to a data stream. Once the number of bits written equals the number of bits in the random number to be generated, the process ends thereby generating a random number which is genuinely random and requires no external stimulation in which to operate.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for generating a random number consisting of a plurality of binary bits, comprising the steps of:
   setting a race condition gate;
   accessing an atomic lock, wherein a first racer representing a first binary bit and a second racer representing a second binary bit race toward the atomic lock upon release of the race condition gate;
   determining which of the first racer representing the first binary bit and the second racer representing the second binary bit gain access to the atomic lock earliest; and
   retrieving the atomic lock based on the determination.

2. The method of claim 1, further comprising:
   writing a single binary bit value to a data stream, the single binary bit value based on which of the first racer and the second racer retrieves the atomic lock.

3. The method of claim 2, wherein the single binary bit value is written to at least one of a computer file, a central processing unit register, a storage disk, and a network.

4. The method of claim 2, wherein if a single binary bit is not written to the data stream, the binary bit value is invalid.

5. The method of claim 1, wherein the first binary bit is a "1" bit.

6. The method of claim 1, wherein the second binary bit is a "0" bit.

7. The method of claim 1, wherein the race condition gate is a cyclic two fold gate.

8. The method of claim 7, wherein the cyclic two fold gate includes a create gate and a release gate.

9. The method of claim 1, further comprising:
confirming the race condition gate is reset; and
verifying that the first racer and the second racer are present at the reset race condition gate before another race begins.

10. The method of claim 1, wherein the method in a data processing system for generating a random number consisting of a plurality of binary bits is completed when the plurality of binary bits equals a parameter.

11. A system in a data processing system for generating a random number consisting of a plurality of binary bits, comprising:
setting means for setting a race condition gate;
accessing means for accessing an atomic lock, wherein a first racer representing a first binary bit and a second racer representing a second binary bit race toward the atomic lock upon release of the race condition gate;
determining means for determining which of the first racer representing the first binary bit and the second racer representing the second binary bit gain access to the atomic lock earliest; and
retrieving means for retrieving the atomic lock based on the determination.

12. The system of claim 11, further comprising:
writing means for writing a single binary bit value to a data stream, the single binary bit value based on which of the first racer and the second racer retrieves the atomic lock.

13. The system of claim 12, wherein the single binary bit value is written to at least one of a computer file, a central processing unit register, a storage disk, and a network.

14. The system of claim 12, wherein if a single binary bit is not written to the data stream, the binary bit value is invalid.

15. The system of claim 11, wherein the first binary bit is a "1" bit.

16. The system of claim 11, wherein the second binary bit is a "0" bit.

17. The system of claim 11, wherein the race condition gate is a cyclic two fold gate.

18. The system of claim 17, wherein the cyclic two fold gate includes a create gate and a release gate.

19. The system of claim 11, further comprising:
confirming means for confirming the race condition gate is reset; and
verifying means for verifying that the first racer and the second racer are present at the reset race condition gate before another race begins.

20. The system of claim 11, wherein the method in a data processing system for generating a random number consisting of a plurality of binary bits is completed when the plurality of binary bits equals a parameter.

21. A system in a data processing system for generating a random number consisting of a plurality of binary bits, comprising:
a processor;
a race condition gate; and
an atomic lock, accessible by a first racer representing a first binary bit and a second racer representing a second binary bit,
wherein the processor sets the race condition gate, the processor accesses the atomic lock, the first racer representing the first binary bit and the second racer representing the second binary bit race toward the atomic lock upon release of the race condition gate, the processor determines which of the first racer representing the first binary bit and the second racer representing the second binary bit gain access to the atomic lock the earliest and wherein the processor retrieves atomic lock based on the determination.

22. The system in claim 21, wherein the processor writes a single binary bit value to a data stream, the single binary bit value based on which of the first racer and the second racer retrieves the atomic lock.

23. The system of claim 21, wherein the first binary bit is a "1" bit.

24. The system of claim 21, wherein the second binary bit is a "0" value.

25. The system of claim 21, wherein the race condition gate is a cyclic two fold gate.

26. The system of claim 21, wherein the processor confirms that the race condition gate is reset and the processor verifies that the first racer and the second racer are present at the reset race condition gate before another race begins.

27. The system of claim 21, wherein the processor completes generating a random number consisting of a plurality of binary bits when the plurality of binary bits equals a parameter.

28. A computer program product in a computer-readable medium for use in a data processing system for generating a random number consisting of a plurality of binary bits, comprising:
first instructions for setting a race condition gate;
second instructions for accessing an atomic lock, wherein a first racer representing a first binary bit and a second racer representing a second binary bit race toward the atomic lock upon release of the race condition gate;
third instructions for determining which of the first racer representing the first binary bit and the second racer representing the second binary bit gain access to the atomic lock earliest; and
fourth instructions for retrieving the atomic lock based on the determination.

29. The computer program product of claim 28, further comprising:
fifth instructions for writing a single binary bit value to a data stream, the single binary bit value based on which of the first racer and the second racer retrieves the atomic lock.

30. The computer program product of claim 28, further comprising:
fifth instructions for confirming the race condition gate is reset; and
sixth instructions for verifying that the first racer and the second racer are present at the reset race condition gate before another race begins.

* * * * *